United States Patent
Mayumi et al.

(10) Patent No.: US 9,761,149 B2
(45) Date of Patent: Sep. 12, 2017

(54) PRESENTER SELECTION SUPPORT APPARATUS, PRESENTER SELECTION SUPPORT SYSTEM, AND PRESENTER SELECTION SUPPORT METHOD

(71) Applicant: FUJITSU LIMITED, Kawasaki-shi, Kanagawa (JP)

(72) Inventors: Hidehiko Mayumi, Kawasaki (JP); toshio tanaka, Yokohama (JP); Takeaki Kobayashi, Yokohama (JP); Kenji Sakata, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 561 days.

(21) Appl. No.: 14/269,554

(22) Filed: May 5, 2014

(65) Prior Publication Data

US 2014/0370483 A1    Dec. 18, 2014

(30) Foreign Application Priority Data

Jun. 12, 2013   (JP) ................. 2013-124009

(51) Int. Cl.
| | |
|---|---|
| G09B 5/00 | (2006.01) |
| G09B 5/06 | (2006.01) |
| G09B 7/02 | (2006.01) |
| G09B 5/02 | (2006.01) |

(52) U.S. Cl.
CPC ............. *G09B 5/00* (2013.01); *G09B 5/06* (2013.01); *G09B 7/02* (2013.01); *G09B 5/02* (2013.01)

(58) Field of Classification Search
CPC .............. G09B 5/00; G09B 5/06; G09B 7/02
See application file for complete search history.

(56) References Cited

U.S. PATENT DOCUMENTS

| | | | |
|---|---|---|---|
| 2002/0106623 A1* | 8/2002 | Moehrle ............. | G09B 23/28 434/365 |
| 2003/0034999 A1* | 2/2003 | Coughlin, III ......... | G09B 7/00 715/738 |

(Continued)

FOREIGN PATENT DOCUMENTS

| | | |
|---|---|---|
| JP | 08-274888 | 10/1996 |
| JP | 2006-92364 | 4/2006 |
| JP | 2009-98740 | 5/2009 |
| KR | 10-2009-0127539 | 12/2009 |

OTHER PUBLICATIONS

Korean Office Action mailed Jan. 20, 2016 in related Korean Application No. 10-2014-0059772.

(Continued)

*Primary Examiner* — Nathan Hillery
(74) *Attorney, Agent, or Firm* — Westerman, Hattori, Daniels & Adrian, LLP

(57) ABSTRACT

A presenter selection support apparatus including: a display unit configured to display one or more opinions input from each of a plurality of terminals; a selection unit configured to select any one of opinions that belongs to a certain group based on a predetermined criterion when the certain group among at least one group formed by being classified from opinions displayed in the display unit is designated; and an instruction unit configured to instruct a terminal, in which an opinion other than the selected opinion is input, to display a screen in which each of a plurality of items related to relevancy to the selected opinion is selectable, wherein the predetermined criterion is a criterion used to specify any one terminal based on the number of times that one item among the plurality of items is selected in the past in each of the plurality of terminals.

7 Claims, 13 Drawing Sheets

(56) References Cited

U.S. PATENT DOCUMENTS

| | | | | |
|---|---|---|---|---|
| 2003/0227479 | A1* | 12/2003 | Mizrahi | A63F 13/10 715/753 |
| 2004/0023195 | A1* | 2/2004 | Wen | G09B 19/06 434/185 |
| 2004/0139156 | A1* | 7/2004 | Matthews | G06Q 30/01 709/204 |
| 2005/0003337 | A1* | 1/2005 | Berman | G09B 19/00 434/323 |
| 2007/0020603 | A1* | 1/2007 | Woulfe | G09B 5/08 434/350 |
| 2007/0122789 | A1* | 5/2007 | Yoo | G09B 7/00 434/323 |
| 2007/0166691 | A1* | 7/2007 | Epstein | G09B 7/00 434/365 |
| 2011/0300527 | A1* | 12/2011 | Epstein | G09B 7/00 434/365 |
| 2012/0231441 | A1* | 9/2012 | Parthasarathy | G09B 7/02 434/362 |
| 2013/0031208 | A1* | 1/2013 | Linton | H04L 67/125 709/217 |

OTHER PUBLICATIONS

Office Action mailed Sep. 13, 2016, issued in counterpart Korean patent application No. 10-2014-0059772 (w/ English translation; 8 pages).

\* cited by examiner

FIG.4

ASSIGNMENT: HOW DO YOU THINK ABOUT RECEIVING DEBRIS? ~911

[Mr. A]
APPROVAL/
DISAPPROVAL:
○ APPROVAL
OPINION: WE ARE TO HELP SOMEONE IN NEED.

[Mr. B]
APPROVAL/
DISAPPROVAL:
○ APPROVAL
OPINION: I THINK WE ARE TO COOPERATE WITH OTHERS FOR THESE THINGS.

[Mr. C]
APPROVAL/
DISAPPROVAL:
○ APPROVAL
OPINION: IF WE ALL HELP TOGETHER, THERE WILL BE NO PROBLEMS.

[Mr. D]
APPROVAL/
DISAPPROVAL:
○ APPROVAL
OPINION: IT MAY BE USED FOR BURIAL.

[Mr. E]
APPROVAL/
DISAPPROVAL:
○ APPROVAL
OPINION: THERE IS NO DIFFERENCE BETWEEN US. DISASTER DUE TO EARTHQUAKE MAY OCCUR ANYWHERE.

[Mr. F]
APPROVAL/
DISAPPROVAL:
× DISAPPROVAL
OPINION: THERE IS A PROBLEM FOR THE SPACE. THERE WILL BE NO REMAINING SPACES.

[Mr. G]
APPROVAL/
DISAPPROVAL:
× DISAPPROVAL
OPINION: WE ARE NERVOUS ABOUT THE HARMFUL EFFECTS.

[Mr. H]
APPROVAL/
DISAPPROVAL:
× DISAPPROVAL
OPINION: WE HAVE A FEELING THAT IT IS UNFAIR THAN A PLACE WHERE DEBRIS RECEIVING IS NOT ALLOWED.

END OF ALL PRESENTATIONS ~913

FIG. 6

ASSIGNMENT: HOW DO YOU THINK ABOUT RECEIVING DEBRIS? ~911

[Mr. A] (93a)
APPROVAL/DISAPPROVAL: ○ APPROVAL
OPINION: WE ARE TO HELP SOMEONE IN NEED.

[Mr. B]
APPROVAL/DISAPPROVAL: ○ APPROVAL
OPINION: I THINK WE ARE TO COOPERATE WITH OTHERS FOR THESE THINGS.

[Mr. C]
APPROVAL/DISAPPROVAL: ○ APPROVAL
OPINION: IF WE ALL HELP TOGETHER, THERE WILL BE NO PROBLEMS.

[Mr. D]
APPROVAL/DISAPPROVAL: ○ APPROVAL
OPINION: IT MAY BE USED FOR BURIAL.

[Mr. E]
APPROVAL/DISAPPROVAL: ○ APPROVAL
OPINION: THERE IS NO DIFFERENCE BETWEEN US. DISASTER DUE TO EARTHQUAKE MAY OCCUR ANYWHERE.

[Mr. F]
APPROVAL/DISAPPROVAL: × DISAPPROVAL
OPINION: THERE IS A PROBLEM FOR THE SPACE. THERE WILL BE NO REMAINING SPACES.

[Mr. G]
APPROVAL/DISAPPROVAL: × DISAPPROVAL
OPINION: WE ARE NERVOUS ABOUT THE HARMFUL EFFECTS.

[Mr. H]
APPROVAL/DISAPPROVAL: × DISAPPROVAL
OPINION: WE HAVE A FEELING THAT IT IS UNFAIR THAN A PLACE WHERE DEBRIS RECEIVING IS NOT ALLOWED.

912

END OF ALL PRESENTATIONS ~913

FIG.7

ASSIGNMENT: HOW DO YOU THINK ABOUT RECEIVING DEBRIS? ~941

~94

~942

[Mr. A IS PRESENTING HIS OPINION]

APPROVAL/ DISAPPROVAL:
　　○ APPROVAL
OPINION : WE ARE TO HELP SOMEONE IN NEED.

~943 END OF ENLARGEMENT DISPLAY

~944 END OF ALL PRESENTATIONS

FIG.9

ASSIGNMENT: HOW DO YOU THINK ABOUT RECEIVING DEBRIS? ~911

[Mr. A]
APPROVAL/
DISAP-
PROVAL: ○ APPROVAL
OPINION: WE ARE TO HELP SOMEONE IN NEED.

PRESEN-
TATION
ENDED  95a

[Mr. B] AP-
PROV-
AL/DIS-
APPROVAL: ○ APPROVAL
OPINION: I THINK WE ARE TO COOPERATE WITH OTHERS FOR THESE THINGS.

COMPLETE-
LY THE SAME
AS OPINION
OF Mr. A  95b

[Mr. C] AP-
PROV-
AL/DIS-
APPROVAL: ○ APPROVAL
OPINION: IF WE ALL HELP TOGETHER, THERE WILL BE NO PROBLEMS.

COMPLETE-
LY THE SAME
AS OPINION
OF Mr. A  95b

[Mr. D]
APPROVAL/
DISAPPROVAL: ○ APPROVAL
OPINION: IT MAY BE USED FOR BURIAL.

~912

[Mr. E] APPROV-
AL/DIS-
APPROVAL: ○ APPROVAL
OPINION: THERE IS NO DIFFERENCE BETWEEN US. DISASTER DUE TO EARTHQUAKE MAY OCCUR ANYWHERE.

WANT TO
SUPPLE-
MENT  95e

[Mr. F]
APPROVAL/
DISAPPROVAL: × DISAPPROVAL
OPINION: THERE IS A PROBLEM FOR THE SPACE. THERE WILL BE NO REMAINING SPACES.

[Mr. G]
APPROVAL/
DISAPPROVAL: × DISAPPROVAL
OPINION: WE ARE NERVOUS ABOUT THE HARMFUL EFFECTS.

[Mr. H]
APPROVAL/
DISAPPROVAL: × DISAPPROVAL
OPINION: WE HAVE A FEELING THAT IT IS UNFAIR THAN A PLACE WHERE DEBRIS RECEIVING IS NOT ALLOWED.

END OF ALL
PRESENTATIONS  ~913

31 STUDENT DB

| STUDENT ID | NAME | NUMBER OF EXEMPTED PRESENTATIONS | | |
|---|---|---|---|---|
| ST001 | A | 4 | | |
| ST002 | B | 2 | | |
| ST003 | C | 1 | | |
| ST004 | D | 0 | | |
| ST005 | E | 2 | | |

32 ASSIGNMENT DB

| ASSIGN-MENT ID | ASSIGNMENT |
|---|---|
| Q001 | HOW DO YOU THINK ABOUT RECEIVING DEBRIS? |
| Q002 | HOW DO YOU THINK ABOUT UNDERAGE ABORTION? |

FIG.12

33 OPINION DB

| ASSIGNMENT ID | STUDENT ID | APPROVAL/ DISAPPROVAL | OPINION | OPINION FLAG | | |
|---|---|---|---|---|---|---|
| | | | | *a UPON DESIGNATION | *b: UPON PRESSING | *c: UPON RE-DISPLAYING |
| Q001 | ST001 (A) | APPROVAL | WE ARE TO HELP SOMEONE IN NEED. | 9 | / | 9 |
| Q001 | ST002 (B) | APPROVAL | I THINK WE ARE TO COOPERATE WITH OTHERS FOR THESE THINGS. | 0 | 1 | 1 |
| Q001 | ST003 (C) | APPROVAL | IF WE ALL HELP TOGETHER, THERE WILL BE NO PROBLEMS. | 0 | 1 | 1 |
| Q001 | ST004 (D) | APPROVAL | IT MAY BE USED FOR BURIAL. | 0 | - | - |
| Q001 | ST005 (E) | APPROVAL | THERE IS NO DIFFERENCE BETWEEN US. DISASTER DUE TO EARTHQUAKE MAY OCCUR ANYWHERE. | 0 | 2 | 2 |
| Q001 | ST006 (F) | DISAPPROVAL | THERE IS A PROBLEM FOR THE SPACE. THERE WILL BE NO REMAINING SPACES. | - | - | - |

PRESENTER SELECTION SUPPORT APPARATUS, PRESENTER SELECTION SUPPORT SYSTEM, AND PRESENTER SELECTION SUPPORT METHOD

CROSS-REFERENCE TO RELATED APPLICATION

This application is based upon and claims the benefit of priority from the prior Japanese Patent Application No. 2013-124009 filed on Jun. 12, 2013, the entire contents of which are incorporated herein by reference.

FIELD

The embodiments discussed herein are related to a presenter selection support apparatus, a presenter selection support system and a presenter selection support method that support teaching operations in conducting a class, a seminar, a conference, etc. . . .

BACKGROUND

Multi-point conferences have been available using a plurality of information processing terminals connected with each other through a network.

In the multi-point conference using the information processing terminals, a technique has been proposed in which the priority level of right to speak is calculated using a function which has one or more of combinations of attributes of conference participants (e.g., a social status, an official post and rank, and a specialized field), a speech accumulated time, and the number of speech times, as variables in order to smoothly advance a multi-point conference according to the purpose thereof.

See, for example, Japanese Laid-open Patent Publication No. 08-274888.

Next-generation type educations using the information processing terminals by the teachers and students have recently been conducted in educational institutions of elementary and secondary schools.

A visual discussion support system has been provided for the next-generation type education. A class is conducted in such a manner that an assignment is transmitted from a teacher's terminal to a student's terminal and each student inputs an opinion for the assignment at the student's terminal to reply to the teacher's terminal. The opinions of respective students are collected in the teacher's terminal and opinions and approvals or disapprovals of all the students are displayed in a form of a matrix shape, which serves as a shared screen between the teacher and students, in a classroom. Also, the teacher allows each student to present his opinion regarding other opinions input by other students.

Here, when all of the students (e.g., several tens of students) in a class present their opinions, the same opinions may be included in the presented opinions and thus, the contents of presented opinions may be overlapped between the opinions to cause waste of time, which is problematic. Accordingly, it is efficient for conducting a class to allow only a representative to present an opinion regarding the same opinions.

In the meantime, in the conventional technology described above, a speaker is determined among a plurality of participants based on a priority level of a right to speak in accordance with a purpose of the conference and thus, a representative speaker for the same opinions may not be determined among the collected opinions for the assignment.

Therefore, even when the conventional technology described above is used in the next generation type education, it is difficult to grasp contents of several tens of opinions collected from respective students in a class for a short time. Accordingly, a representative of the students who have been regarded as having the same opinion may not be able to present the same opinion in an efficient manner. Further, among the students, there may be a student who tries to avoid presentation by replying to the teacher's terminal that "I have the same opinion as that of Mr. XX", in spite of that the student has a different focus on the assignment. There is a problem that such a student cannot be determined.

One aspect of the present disclosure intends to suppress a student from trying to avoid presenting his opinion.

SUMMARY

According to an aspect of the embodiment, a presenter selection support apparatus includes: a display unit configured to display one or more opinions input from each of a plurality of terminals; a selection unit configured to select any one of opinions that belongs to a certain group based on a predetermined criterion when the opinion which belongs to the certain group among at least one group formed by being classified from opinions displayed in the display unit is designated; and an instruction unit configured to instruct a terminal, in which an opinion other than the selected opinion by the selection unit among opinions that belong to a certain group is input, to display a screen in which each of a plurality of items related to relevancy to the selected opinion is selectable. In the presenter selection apparatus, the predetermined criterion is a criterion used to specify any one terminal among terminals into which opinions that belongs to the certain group are input based on the number of times that one item among the plurality of items is selected in the past in each of the plurality of terminals and select the opinion input into the specified terminal.

Further, the object to be solved may be accomplished by a presenter selection support system, a presenter selection support method, a computer executable presenter selection support program that, when executed, causes a computer to function as the presenter selection support apparatus and a computer readable storage medium storing the computer executable presenter selection support program.

The object and advantages of the disclosure will be realized and attained by means of the elements and combinations particularly pointed out in the claims. It is to be understood that both the foregoing general descriptions and the following detailed descriptions are exemplary and explanatory, and are not restrictive of the invention, as claimed.

According to an aspect of the embodiment, it is possible to suppress a student from trying to avoid presenting his opinion.

BRIEF DESCRIPTION OF DRAWINGS

FIG. 4 is a view illustrating a display example in which opinions of all the students are displayed in a shared screen.

FIG. 6 is a view illustrating a display example in which a representative presenter is specified.

FIG. 7 is a view illustrating an example of opinion displayed in an enlarged scale.

FIG. 11 is a view illustrating an exemplary data configuration of a student database and an assignment database.

FIG. 12 is a view illustrating an exemplary data configuration of an opinion database.

DESCRIPTION OF EMBODIMENTS

Figure 1:
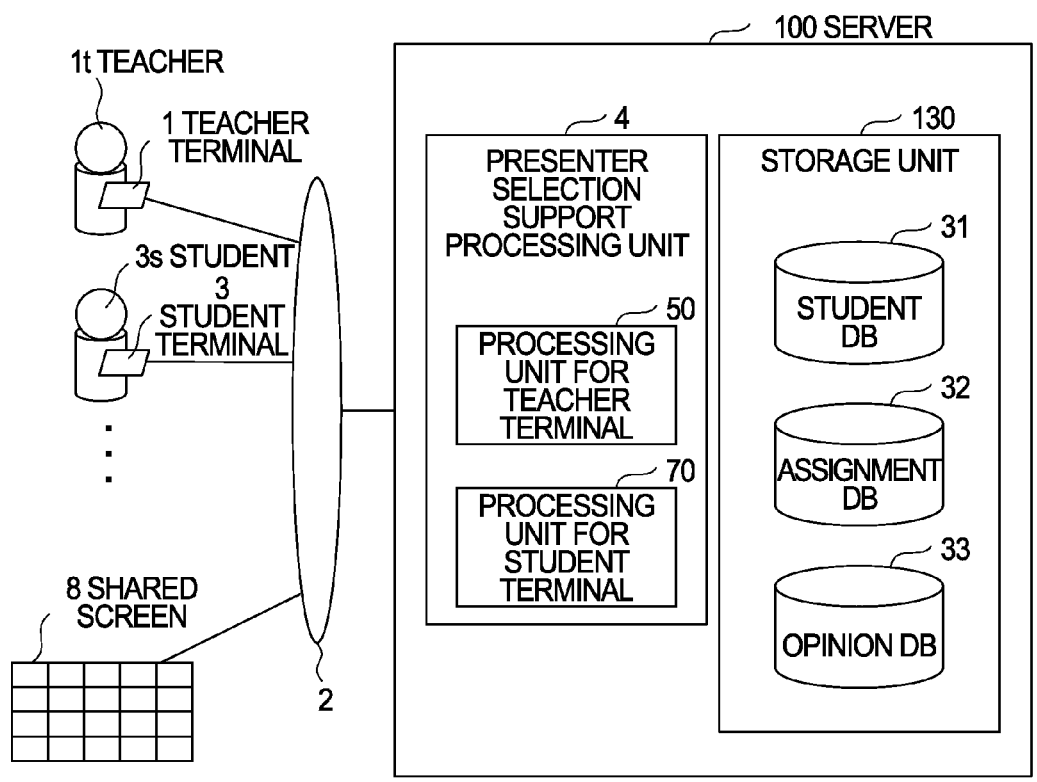
FIG. 1 is a view illustrating an exemplary configuration of a presenter selection support system according to an embodiment of the present disclosure.

Hereinbelow, exemplary embodiments of the present disclosure will be described with reference to the drawings. FIG. 1 is a view illustrating an exemplary configuration of a presenter selection support system according to an embodiment of the present disclosure. In FIG. 1, a presenter selection support system 1000 according to the embodiment includes a server 100, a teacher terminal 1, a plurality of student terminals 3 and a shared screen 8.

The shared screen 8 is a screen referenced by a teacher 1*t* and a student 3*s*. The shared screen 8 may be a screen projected onto a screen in a classroom through a projector. The server 100, the teacher terminal 1, the plurality of student terminals 3, and the projector are connected with each other through a network 2. In the configuration illustrated in FIG. 1, each of the server 100 and the teacher terminal 1 is exemplified as a separate computer apparatus, but may be incorporated into a single computer apparatus.

The teacher terminal 1 is a computer apparatus used by the teacher 1*t*. The student terminal 3 is a computer apparatus used by each student 3*s*. Each of the teacher terminal 1 and the student terminal 3 includes, for example, a control unit formed by a CPU, a display unit, an input unit and a communication unit. The display unit may be a touch panel type display unit which is also equipped with an input function. In this case, the input unit may be omitted.

The shared screen 8 is a screen projected onto a screen in a classroom and referenced by the teacher 1*t* and a plurality of students 3*s* in the classroom, and corresponds to the display unit. The display contents of the shared screen 8 are controlled by the server 100. Further, the same contents of display as that of the shared screen 8 are also displayed on the teacher terminal 1 by the server 100.

The server 100 is a computer apparatus and includes a presenter selection support processing unit 4 and a storage unit 130. The server 100 may correspond to the presenter selection apparatus. The presenter selection support processing unit 4 is implemented by a presenter selection application installed in the server 100 and corresponds to a selection unit which selects a representative presenter who presents the opinion in representative of a group of the students who have the same opinion. The teacher terminal 1 and each student terminal 3 use the presenter selection application through the network 2.

The presenter selection support processing unit 4 refers to an opinion DB 33 in which opinions and approval or disapproval for an assignment transmitted from the student terminals 3 are collected to determine students who have the truly same opinion among the students who claimed as having the same opinion for the assignment.

The presenter selection support processing unit 4 further includes a processing unit for teacher terminal 50 and a processing unit for student terminal 70. The processing unit for teacher terminal 50 corresponds to a first selection unit which controls the processes related to the teacher terminal 1 and the shared screen 8 regarding a presenter selection process. The processing unit for student terminal 70 corresponds to a second selection unit which controls the processes related to the student terminal 3 regarding the presenter selection process.

The processing unit for teacher terminal 50 performs the processing for the teacher terminal 1 and specifies a student, who has the largest number of times being exempted from presentation (hereinafter, referred to as "the number of exempted presentations") that indicates the number of times that the student has agreed on the opinion presented by the representative presenter in the past, from the group of students who have the same opinion as that of the representative presenter when the teacher 1*t* designates an opinion of any student. An opinion of the student who becomes the specified representative presenter is displayed on the shared screen 8 in an enlarged scale. A user interface, for displaying information for the teacher 1*t* on the teacher terminal 1 and also for receiving input by the teacher 1*t*, is displayed on the teacher terminal 1 by the processing unit for teacher terminal 50. The processing unit for teacher terminal 50 also performs the processes according to an input onto the teacher terminal 1 by the teacher 1*t*.

The processing unit for student terminal 70 performs a processing for the student terminals 3 and counts the number of exempted presentations indicating the number of times that the student has agreed on the opinion presented by the representative presenter.

The number of exempted presentations indicates that the student has agreed on the opinions presented by the representative presenters in the past. In the meantime, the number of exempted presentations may indicate the number of times that a student has exempted from the presentation due to his agreement on the opinions presented by the representative presenters in the past.

A user interface, for displaying information for the student 3*s* on the student terminal 3 and also for receiving input by the student 3*s*, is displayed on the student terminal 3 by the processing unit for student terminal 70. The processing unit for student terminal 70 also performs a processing according to an input onto the student terminal 3 by the student 3.

The shared screen 8 is a screen projected onto, for example, a screen in the classroom by the control of the presenter selection support processing unit 4.

A student DB 31 is a database in which student information such as a student name or the number of exempted presentations is stored by being associated with every student ID. An assignment DB 32 is a database in which an assignment prepared by the teacher 1*t* in advance is stored by being associated with every assignment ID. An opinion DB 33 is a database in which, for example, selections of the approval or disapproval or the opinions of each student is stored by being associated with every assignment ID.

Figure 2:
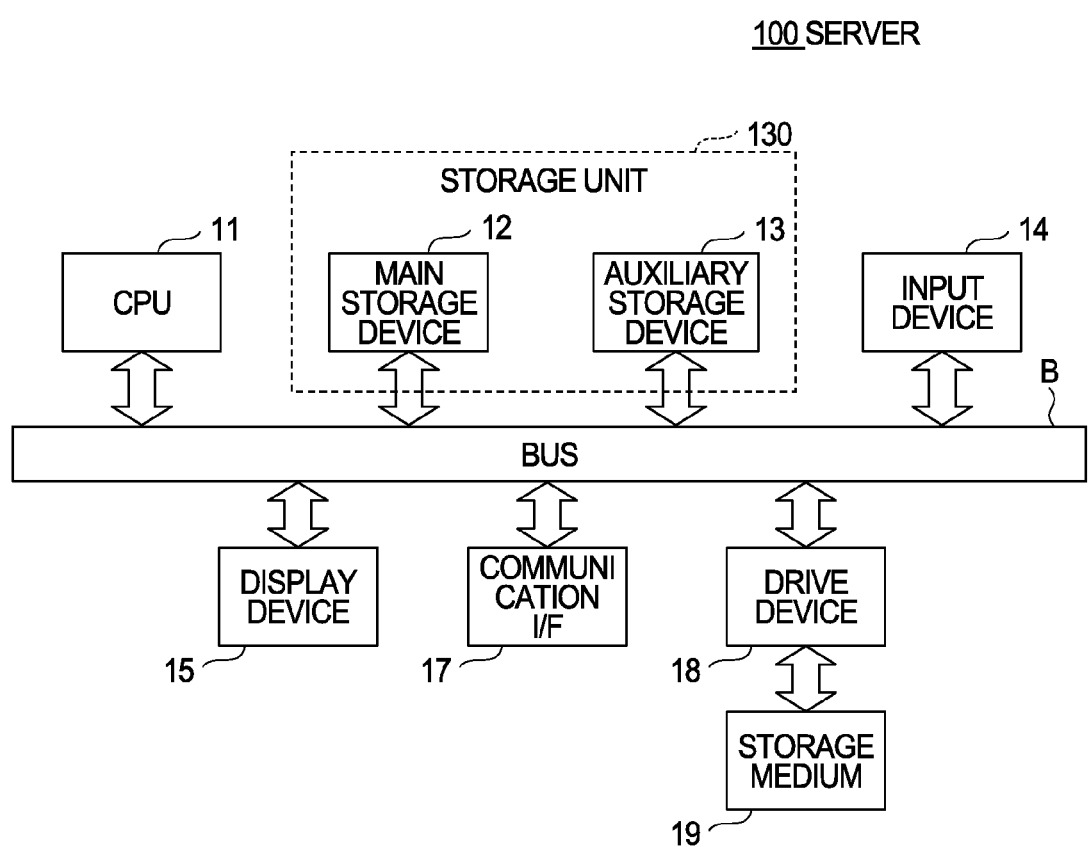
FIG. 2 is a view illustrating an exemplary hardware configuration of a server.

FIG. 2 is a view illustrating an exemplary hardware configuration of a server. In FIG. 2, the server 100 is a terminal controlled by a computer, and includes a CPU (Central Processing Unit) 11, a main storage device 12, an auxiliary storage device 13, an input device 14, a display device 15, a communication interface (I/F) 17 and a drive device 18, all connected to a bus B.

The CPU 11 controls the server 100 according to a program stored in the main storage device 12. For example, RAM (Random Access Memory) or ROM (Read Only Memory) is used in the main storage device 12 and a program executed in the CPU 11, data necessary for processing in the CPU 11 or data obtained by processing in the CPU 11 are stored in the main storage device 12. Further, a portion of memory region of the main storage device 12 is allocated as a work area used for the processing in the CPU 11.

A hard disk drive is used for the auxiliary storage device 13 and data such as programs for executing various processings are stored in the auxiliary storage device 13. A portion of the program stored in the auxiliary storage device 13 is loaded to the main storage device 12 and is executed by the CPU 11 and thus, various processings are implemented. The storage unit 130 includes the main storage device 12 and/or the auxiliary storage device 13.

The input device 14 is equipped with, for example, a mouse or keyboard, and is used for inputting various information necessary for the processing by the server 100 by an operational manager or a teacher. The display device 15 displays various information required for the processings under the control of the CPU 11. The communication I/F 17 is an apparatus for connecting to, for example, the Internet or a LAN (Local Area Network) to control a communication between, for example, the teacher terminal 1 and the student terminal 3. The communication by the communication I/F 17 is not limited to wired or wireless communication.

The program implementing the processing performed by the server 100 is provided to the server 100 by the storage unit 19, such as a CD-ROM (Compact Disc Read-Only Memory).

The drive device 18 performs an interface with the storage unit 19 (e.g., CD-ROM) set in the drive device 18 and the server 100.

Further, a program which implements the presenter selection process according to the embodiment to be described below is stored in the storage unit 19 and the program stored in the storage unit 19 is installed in the server 100 through the drive device 18. The installed program becomes executable by the server 100.

In the meantime, a medium storing the program is not limited to the CD-ROM and may include any type of computer readable medium. The computer readable medium may include a DVD disk, a portable recording medium such as a USB memory, or a semiconductor memory such as a flash memory, in addition to the CD-ROM.

Before explaining a specific processing flow, the presenter selection process according to the embodiment will be outlined with reference to screen examples of the teacher terminal 1, the student terminal 3, and the shared screen 8.

Figure 3:
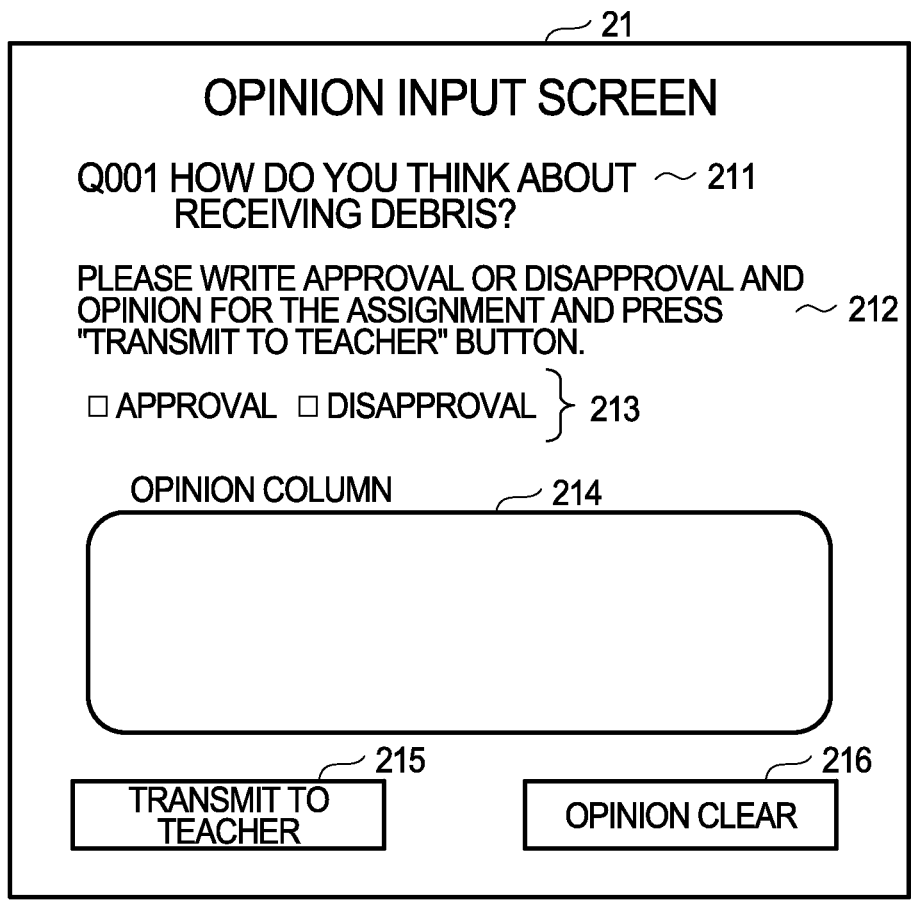
FIG. 3 is a view illustrating a display example of an opinion input screen.

FIG. 3 is a view illustrating a display example of an opinion input screen. The opinion input screen 21 illustrated in FIG. 3 is displayed in a display unit of the student terminal 3. The opinion input screen 21 includes an assignment 211, an instruction content 212, an approval or disapproval selection 213, an opinion column 214, a "Transmit to teacher" button 215, and an "Opinion clear" button 216.

The assignment 211 indicates an assignment designated by the teacher 1t. The instruction content 212 designates matters that cause the student 3s to perform an action in the opinion input screen 21. In this example, "Q001 How do you think about receiving debris?" is displayed in the assignment 211. Further, the instruction content 212 indicates, for example, "Please write the approval or disapproval and the opinion for the assignment described above and press the 'Transmit to teacher' button."

The approval or disapproval selection 213 is an area for allowing the student 3s to select either an approval or disapproval for the assignment 211. The opinion column 214 is an input area into which the student 3s may input the opinion. The student 3s inputs the opinion for the assignment 211 into the opinion column 214.

The "Transmit to teacher" button 215 is a button for transmitting the result of approval or disapproval selected in the approval or disapproval selection 213 for the assignment 211 and an opinion input into the opinion column 214 by the student 3s. The result of approval or disapproval and the opinion are transmitted from the student terminal 3 to the server 100 in response to the pressing of the "Transmit to teacher" button 215.

The "Opinion clear" button 216 is a button for returning the result of the approval or disapproval selected in the approval or disapproval selection 213 for the assignment 211 and opinion input into the opinion column 214 by the student 3s to an initial state. The student 3s may press the "Opinion clear" button 216 to return the approval or disapproval selection 213 and the opinion column 214 to the initial state in order to perform a re-selection of the approval or disapproval and re-input of the opinion again.

The result of the approval or disapproval and opinion transmitted from the student terminal 3 are stored in the opinion DB 33 within the storage unit 130 of the server 100.

FIG. 4 is a view illustrating a display example in which opinions of all the students are displayed in a shared screen. A display content 91 of the shared screen 8 illustrated in FIG. 4 includes an assignment 911, an opinion list 912, and an "End of all presentations" button 913.

The assignment 911 indicates an assignment designated by the teacher 1t. In this example, "Assignment: How do you think about receiving debris?" is displayed in the assignment 911. The opinion list 912 displays the contents of the opinions of all the students 3s.

When the number of students in a class is forty (40), forty (40) contents of opinions are displayed, but in this example, a case where the number of all the students in a class is eight (8) is indicated in order to simplify descriptions. The results of approval or disapproval and the opinions of respective students A, B, C, D, E, F, G and H are displayed. The students A, B, C, D and E indicate an opinion of "○ approval" for the assignment 911. In the meantime, the students F, G and H indicate an opinion of "x disapproval" for the assignment 911.

Figure 5:
FIG. 5 is a view illustrating an example of opinions displayed and grouped.

When the teacher 1t designates an opinion of any student from the opinion list 912 of the display content 91 displayed in the teacher terminal 1 using a pointer 9 in the teacher terminal 1, the processing unit for teacher terminal 50 of the server 100 groups opinions that are the same as that of the designated opinion to display the grouped opinions in a different color for each group to allow the group to be easily discerned as illustrated in FIG. 5.

FIG. 5 is a view illustrating an example of opinions displayed and grouped. A display content 92 of the shared screen 8 illustrated in FIG. 5 includes the assignment 911, the opinion list 912, and the "End of all presentations" button 913 and thus, the description thereof will be omitted.

In the opinion list 912 of the display content 92, the opinions that are the same as that of the student C are grouped in the same group together with the opinion of the student C and the grouped opinions are displayed in a different background color to be easily discerned from the other opinions. The opinions in the group are displayed in the same background color. Grouping may be performed using, for example, conventional document similarity determination method.

In this example, the opinions of the students A, B, D and E together with the opinion of the student C are displayed in a different background color to distinguish from the opinions of the students F, G and H that are not grouped together with the opinion of the student C. The teacher 1t may visually and easily know the existence of the opinions of the students A, B, D and E that are the same as that of the designated student C.

In the opinion list 912, a student who has the largest number of exempted presentations is specified as a representative presenter after the background color of the opinions within the group is changed. The opinion of the specified student 3s is highlighted in the opinion list 912 (FIG. 6), and then, displayed on the shared screen 8 in an enlarged scale (FIG. 7). The processing unit for teacher terminal 50 displays the opinion in an enlarged scale and allows a same opinion communication screen (FIG. 8) to be displayed in the student terminal 3 of the other students 3s who have transmitted the same opinion as that of the designated student 3s.

FIG. 6 is a view illustrating a display example in which a representative presenter is specified. A display content 93 of the shared screen 8 illustrated in FIG. 6 includes the assignment 911, the opinion list 912, and the "End of all presentations" button 913 as in FIG. 4, and thus, the description thereof will be omitted.

In the opinion list 912 of the display content 93, a highlighting display 93a indicates that the students A is specified as a representative presenter. Though the teacher 1t has designated the opinion of the student C but the student A is caused to present his opinion in representative of the students 3s who have the same opinion.

FIG. 7 is a view illustrating an example opinion displayed in an enlarged scale. The display content 94 illustrated in FIG. 7 are the contents displayed in the shared screen 8 in an enlarged scale when the teacher 1t has designated the opinion of the student A, and includes an assignment 941, an opinion 942, an "End of enlargement display" button 943, and an "End of all presentations" button 944. Further, the display content 94 is also displayed in the teacher terminal 1. The display content 94 is not displayed in the student terminals 3.

The assignment 941 indicates an assignment designated by the teacher 1t. In this example, "Assignment: How do you think about receiving debris?" is displayed in the assignment 941. The opinion 942 indicates that the student A is presenting his opinion, and indicates the result of approval or disapproval and the opinion of the student A.

The "End of enlargement display" button 943 is a button for ending displaying of the display content 94. In a case where a presentation of the student A is ended, when the teacher 1t presses the "End of enlargement display" button 943 from the display content 94 displayed in the teacher terminal 1, the processing unit for teacher terminal 50 of the server 100 ends displaying of the display content 94.

The "End of all presentations" button 944 is a button for ending displaying of the display content 94 and ending all presentations. In a case where a presentation of the student A is ended, when the teacher 1t presses the "End of enlargement display" button 944 from the display content 94 displayed in the teacher terminal 1, the processing unit for teacher terminal 50 of the server 100 ends displaying of the display content 94 to end all presentations.

Figure 8:
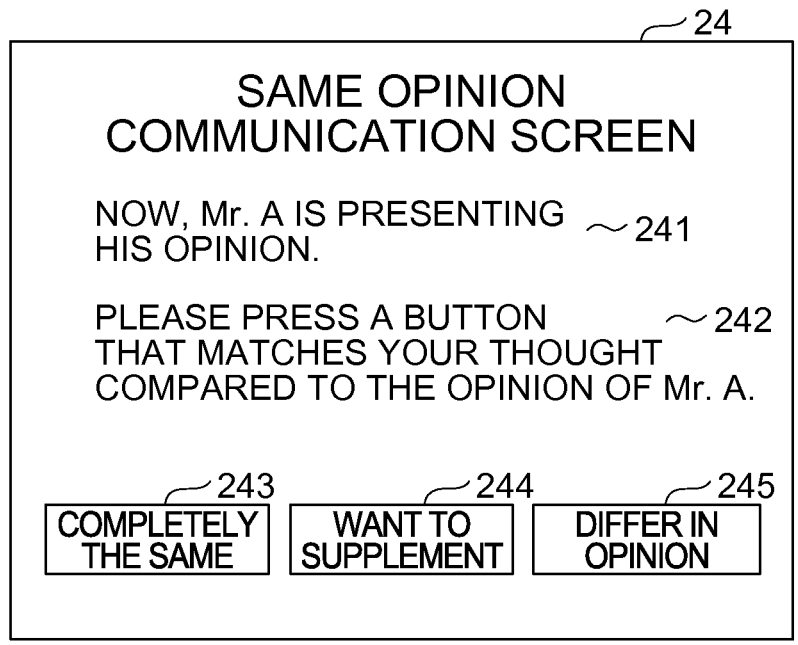
FIG. 8 is a view illustrating a display example of the same opinion communication screen.

FIG. 8 is a view illustrating a displayed example of the same opinion communication screen. FIG. 8 illustrates a display example of the same opinion communication screen 24 in a case where the student A designated by the teacher 1t is presenting his opinion. The same opinion communication screen 24 illustrated in FIG. 8 is displayed in the display unit of the student terminals 3 of other students B, C, D and E who have transmitted the same opinion as that of the student A. The same opinion communication screen 24 includes a message 241, an instruction content 242, a "completely the same" button 243, a "want to supplement" button 244, and a "differ in opinion" button 245.

The message 241 indicates that the student designated by the teacher 1t is presenting his opinion. The instruction content 242 designates matters that cause the student 3s to perform an action according to the instruction content in the same opinion communication screen 24. In this example, a message of "Mr. A is presenting now." is displayed in the message 241. Further, the instruction content 242 indicates, for example, "Please press the button that matches your thought compared to the opinion of Mr. A.".

The "completely the same" button 243 is a button for notifying that the student has the completely same opinion as that of Mr. A who is presenting his opinion. The "want to supplement" button 244 is a button for notifying that the student wants to supplement the opinion of Mr. A who is presenting his opinion. The "differ in opinion" button 245 is a button for notifying that the student has an opinion different from that of Mr. A who is presenting his opinion.

In this example, when the student A who is specified as a representative presenter by the processing unit for teacher terminal 50 is designated by the teacher 1t, the students B, C, D and E other than the student A in the same group are determined as candidates having the same opinion. The same opinion communication screen 24 is displayed in the student terminals 3 of the students B, C, D and E that are the candidates having the same opinion. The same opinion communication screen 24 is not displayed in the terminals 3 of the students F, G and H that do not have the same opinion as that of the student A, that is, do not belong to the same group as a group to which the student A belongs. Further, even when a student belongs to the same group as the group to which the student A belongs, the same opinion communication screen 24 is not displayed in the terminal 3 of the student for which a same opinion flag (described later) is set as "9", "1" or "2".

It is assumed that the students B, C, D and E have performed the following manipulation. • The student B has pressed the "completely the same" button 243. • The student C has pressed the "completely the same" button 243 intending to avoid his presentation. • The student D did not press any button. • The student E has pressed the "want to supplement" button 244. In the meantime, the student who has pressed the "differ in opinion" button 245 may be handled as a student who has an opinion which is not the same opinion as that of the student A.

Figure 9:
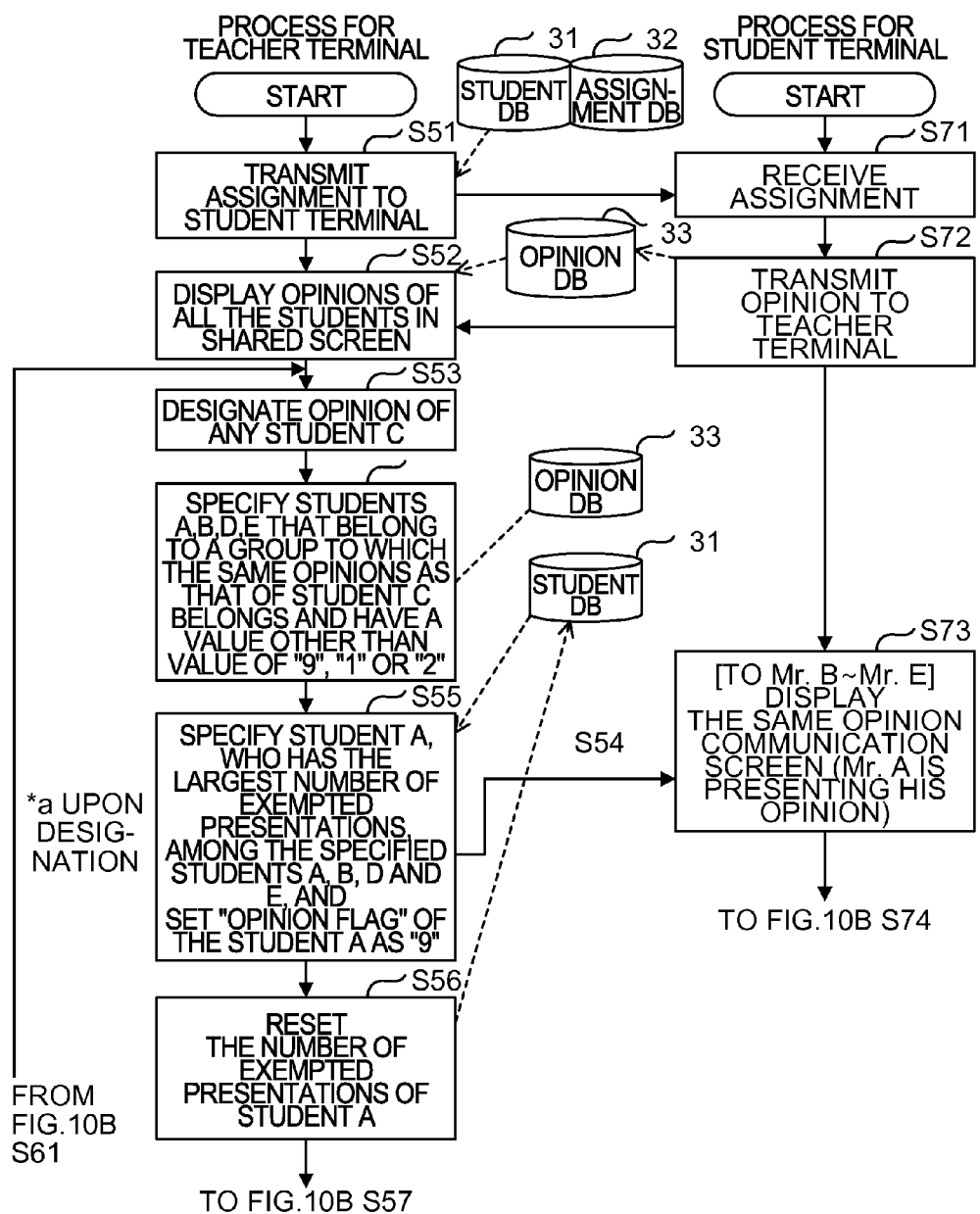
FIG. 9 is a view illustrating a masking display example.

In a case where displaying the opinion of the student A in an enlarged scale (FIG. 7) is ended, that is, when the presentation of the student A is ended, the display content 95 as illustrated in FIG. 9 is displayed in the shared screen 8. FIG. 9 is a view illustrating a masking display example. The display content 95 of the shared screen 8 illustrated in FIG. 9 includes, for example, the assignment 911, the opinion list 912, or the "End of all presentations" button 913 similarly to FIG. 4, and thus the description thereof will be omitted.

An auxiliary display 95a of "Presentation ended" is displayed in a color, such as red color, which is different from other character color for the opinion of the student A who has ended presentation in the opinion list 912 of the display content 95.

An auxiliary display 95b is displayed in a color, such as green color, which is different from other character color for the opinion of the students who have pressed a button in the "same opinion communication screen" among the students B, C, D and E. The students who have pressed the buttons are the students B, C and E. Since the student B and the student C have pressed the "completely the same" button 243, the auxiliary display 95b indicating "Completely the same as that of Mr. A" is displayed in the opinions of the student B and student C, and an auxiliary display 95e indicating "want to supplement" is displayed in the opinion of the student E.

The opinion of the student A who is the representative presenter and the opinions of the student B and student C who have pressed the "completely the same" button 243 for the opinion presented by the student A are displayed with being masked in the opinion list 912 of the display content 93. The opinions of the students D, E, F, G and H are maintained in their original displays.

The displaying as described above in the shared screen 8 is performed at the teacher terminal 1 as well. Thereafter, when the teacher 1t designates the student E using a pointer 9 in order to supplement the opinion which has been presented by the student A, the same processing as the processing for the case where the student C is designated (FIG. 4) is repeated.

Figure 10:
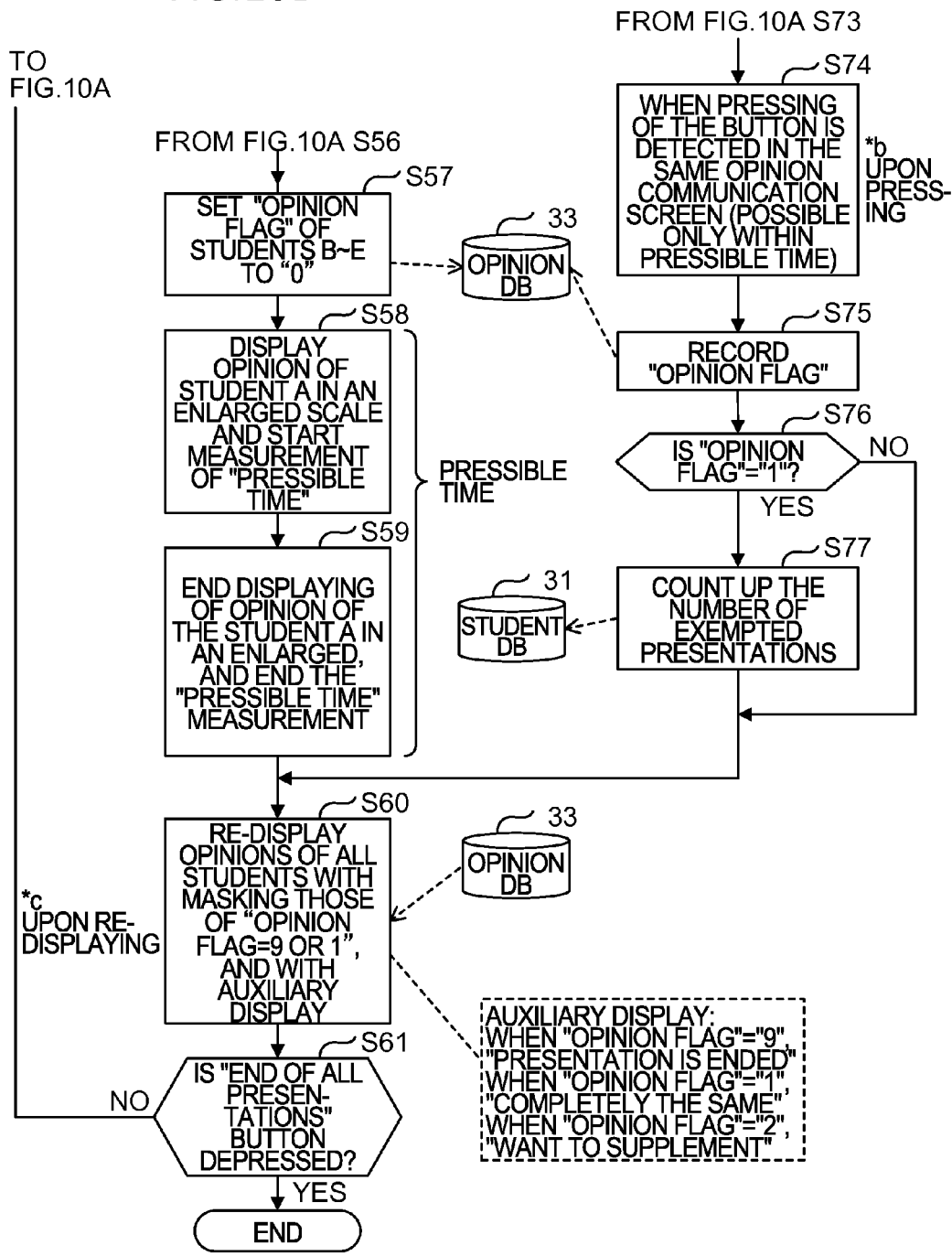
FIG. 10A and FIG. 10B are flowcharts for explaining a presenter selection support process.

A presenter selection support process by the presenter selection support processing unit 4 in the server 100 as described above will be described with reference to FIG. 10A and FIG. 10B. FIG. 10A and FIG. 10B are flowcharts for explaining a presenter selection support process. In FIG. 10A and FIG. 10B, the processes from step S51 to step S61 correspond to the processes to be performed by the processing unit for teacher terminal 50. Further, the processes from step S71 to step S77 correspond to the processes to be performed by the processing unit for student terminal 70. In FIG. 10A and FIG. 10B, explanatory notes of *a, *b and *c correspond to the changes of an "opinion flag" value illustrated in FIG. 12.

When the teacher 1t selects an assignment among the assignments stored in the assignment DB 32, the processing unit for teacher terminal 50 transmits the assignment selected by the teacher 1t to the student terminal 3 of the student 3s registered in the student DB 31 (step S51).

The processing unit for student terminal 70 receives the assignment (step S71). The opinion input screen 21 as illustrated in FIG. 3 is displayed in the student terminal 3 by the processing unit for student terminal 70. The student 3s selects an approval or disapproval for the assignment and inputs an opinion in the opinion input screen 21, and transmits the selected approval or disapproval and the input opinion to the teacher 1t (step S72). Further, the processing unit for student terminal 70 associates the result of the selected approval or disapproval and the input opinion with a student ID to be stored in the opinion DB 33.

The processing unit for teacher terminal 50 refers to the opinion DB 33 to display the opinions of all the students (FIG. 4) in the shared screen 8 (step S52). The opinions of all the students (FIG. 4) are also displayed in the teacher terminal 1.

When the teacher 1t designates an opinion of any student C from the opinion list 912 (FIG. 4) (step S53), the processing unit for teacher terminal 50 refers to the opinion DB 33 to specify the students A, B, D and E, that belong to the group regarded as a group to which the same opinions as that of the student C belongs and have the "opinion flag" indicated as a value other than a value of "9", "1" or "2" (step S54).

The processing unit for teacher terminal 50 refers to the student DB 31 to specify the student A, who has the largest number of exempted presentations, among the specified students A, B, D and E to set the "opinion flag" of the student A of the opinion DB 33 as "9" (step S55). Further, the processing unit for teacher terminal 50 instructs the processing unit for student terminal 70 to display the same opinion communication screen 24 (FIG. 8) in the student terminals 3 of the students B, C, D and E (step S73).

Also, the processing unit for teacher terminal 50 resets the number of exempted presentations of the student A of the student DB 31 (step S56). Further, the processing unit for teacher terminal 50 sets the "opinion flag" of the students B, C, D and E of the opinion DB 33 as zero (step S57).

The processing unit for teacher terminal 50 displays the opinion of the student A in the shared screen 8 in an enlarged scale (FIG. 7) and starts measurement of "pressible time" (step S58). Also, when the presentation of the student A is ended, the processing unit for teacher terminal 50 ends displaying the opinion of the student A in an enlarged scale in the shared screen 8 (FIG. 7), and ends the measurement of "pressible time" (step S59).

The processing unit for student terminal 70 displays the same opinion communication screen 24 (FIG. 8) in the student terminals 3 of the students B, C, D and E (step S73) according to the instruction to display by the processing unit for teacher terminal 50 at step S55. The student A is presenting his opinion.

Also, each of the students B, C, D and E presses any one of the buttons 243, 244, 245 in the same opinion communication screen 24 (FIG. 8) displayed in the student terminal 3 (step S74). The students B, C, D and E may select the button in the same opinion communication screen 24 (FIG. 8) only during displaying an opinion in an enlarge scale (FIG. 5), that is, during the pressible time. When the pressing of the button is detected, the processing unit for student terminal 70 records the "opinion flag" associated with the student ID of each of the students B, C, D and E of the opinion DB 33 (step S75). Manipulations for the "opinion flag" are as follows. • When the "completely the same" button 243 is pressed, the "opinion flag" in the opinion DB 33 is set as "1". • When the "want to supplement" button 244 is pressed, the "opinion flag" in the opinion DB 33 is set as "2". • When the "differ in opinion" button 245 is pressed, the "opinion flag" in the opinion DB 33 is set as "0".

The processing unit for student terminal 70 determines whether the "opinion flag" indicates "1" (step S76). When it is determined that the "opinion flag" does not indicate "1", a process in the processing unit for student terminal 70 is ended. Otherwise, when any of the "opinion flag" indicates "1", the processing unit for student terminal 70 counts up the number of exempted presentations associated with the relevant student IDs of the students B, C, D or E of the student DB (step S77), and the process in the processing unit for student terminal 70 is ended.

The processing unit for teacher terminal 50 refers to the opinion DB 33 according to the end of the process in the processing unit for student terminal 70 to mask the opinion of the student who has the "opinion flag" indicating the number of "9" or "1" and perform an auxiliary display depending on the selection of the button in the same opinion communication screen 24 (FIG. 6) of the students B, C, D and E, thereby redisplaying the shared screen 8 (step S60).

The auxiliary displays indicates that when the "opinion flag" is the number "9", the opinion is "presentation is ended", when the "opinion flag" is the number of "1", the opinion is "completely the same", and when the "opinion flag" is the number of "2", the opinion is "want to supplement".

The processing unit for teacher terminal 50 determines whether the "End of all presentations" button 913 or 944 is pressed by the teacher 1t (step S61). When the depression of the "End of all presentations" the button 913 or 944 is not detected, the processing unit for teacher terminal 50 returns to step S53, and repeats the processes described above. Further, the process by the processing unit for student terminal 70 is repeated by being associated with the process by the processing unit for teacher terminal 50.

FIG. 11 and FIG. 12 are views illustrating exemplary data configuration of databases. FIG. 11 illustrates exemplary data configuration of the student DB 31 and the assignment DB 32 and FIG. 12 illustrates an exemplary data configuration of the opinion database 33.

The student DB 31 includes fields for student information, such as student ID, name or number of exempted presentations. A student ID in the student ID field indicates identification information for specifying the student 3s, the name in the name field indicates a full name of the student 3s and the number of exempted presentations in the name number of exempted presentations field indicating the number of times that the student is exempted from presentation since he has the same opinion as that of other students.

In this example, the student information, such as the name "A" or the number of exempted presentations "4", is associated with the student ID of "ST001". The number of exempted presentations of the student is reset when the student presents his opinion, and is set as zero (step S56 of FIG. 10A).

When the representative presenter is the first presenter, the number of exempted presentations is reset and when presentation of the representative presenter corresponds to the after-first-presentation of a representative presenter, the number of exempted presentations may be changed to a value obtained by setting the number of exempted presentations to a predetermined percentage of the number of exempted presentations instead of resetting the number of exempted presentations. Further, the number of exempted presentations of all the students may be reset at the beginning of every month.

The assignment DB 32 includes fields for assignment ID and assignment. An assignment ID indicates identification information for specifying an assignment and the assignment indicates the content of the assignment prepared in advance by the teacher 1t. In this example, the assignment specified the assignment ID of "Q001" is "How do you think about receiving debris?"

The opinion DB 33 includes fields for assignment ID, student ID, approval or disapproval, and opinion and opinion flag. The assignment ID indicates an assignment ID registered in the assignment DB 32. The student ID indicates a student ID registered in the student DB 31. In this example, student name is indicated in the "( )" in addition to the student ID, but the student name may be omitted.

The approval or disapproval field indicates the result of approval or disapproval selected by the student 3s about the assignment in the opinion input screen 21 (FIG. 3). The opinion field indicates an opinion input by the student 3s about the assignment in the opinion input screen 21.

The opinion flag field indicates an opinion transition of the student 3s regarding the presentation. In FIG. 12, a value of an opinion flag in the opinion flag field is originally indicated as "1", but the opinion flag value is indicated as a separate value for each event such as a button selection of the student 3s in order to indicate the opinion transition. Specifically, the opinion flags indicates values that are set in each state of "*a: upon designation", "*b: upon pressing" and "*c: upon re-displaying" illustrated in FIG. 10A and FIG. 10B.

The opinion DB 33 illustrated in FIG. 12 indicates an example of data in a case where the student A, who is designated by the teacher 1t, having the student ID of "ST001" has presented his opinion about the assignment "How do you think about receiving debris?" specified by the assignment ID. Data regarding the other assignments are stored and managed in the same configuration in the opinion DB 33.

Descriptions will be made on a case where the student C is arbitrarily selected by the teacher 1t in the opinion list 912 of the display content 91 of the shared screen 8 illustrated in FIG. 4.

In the example of data, the student A having the student ID of "ST001" has an "approval" for the assignment and expresses an opinion of "We are to help someone in need." (step S72 of FIG. 10A). The student A is designated by the teacher 1t as a representative presenter ("*a: upon designation": the display content 93 of the shared screen 8 of FIG. 6 and step S55 of FIG. 10A) and thus, the number "9" is set in the opinion flag of the student A (step S56 of FIG. 10A).

Since the student A is the representative presenter, events of the "*b: upon pressing" and "*c: upon re-displaying" do not exist in a processing for the student A. Accordingly, the opinion flag of the student A is not changed and thus, indicated as a symbol "/" for convenience of explanation. The symbol "/" simply indicates that the opinion flag is not changed and does not indicate the value of the opinion flag. Accordingly, at "*c: upon re-displaying", the opinion flag of the student A indicates the number "9" which is set at "*a: upon designation". The opinion of the student A is masked upon redisplaying (FIG. 9) of the shared screen 8 and exempted from the next candidates for presentation.

The processing unit for teacher terminal 50 sets the opinion flag of the students B, D and E, who have the same opinion as that of the designated student C and the value of opinion flag other than "9", "1" or "2", as "0" (step S57 of FIG. 10B) according to designation of the student C who is arbitrarily selected by the teacher 1t. The opinion flag for other students including the student F other than the students A, B, C, D and E indicates the symbol "-" which indicates an unset.

The student B having the student ID of "ST002" has an "approval" for the assignment and expresses an opinion of "I think we are to cooperate with others for these things" (step S72 of FIG. 10A). Due to this opinion, the student B is determined as having the same opinion as that of the student C by the processing unit for teacher terminal 50 and thus, the opinion flag of the student B is set as "0" (*a: upon designation: step S57 of FIG. 10B).

Further, the student B selects the "completely the same" button 243 in the same opinion communication screen 24 (FIG. 8) displayed due to the determination that the student B has the same opinion as that of the student C (*b: upon pressing). The opinion flag of the student B is set as "1" by the processing unit for student terminal 70 (step S75 of FIG. 10B). When the opinion list 912 is redisplayed in the shared screen 8 (*c: re-displaying), and the opinion flag of the student B indicates the number "1". Upon redisplaying of the shared screen 8 (FIG. 9), the opinion of the student B is masked by the processing unit for teacher terminal 50 (step S60 of FIG. 10B) and exempted from the next candidates for presentation. The number of exempted presentations of the student B is counted up.

The student C having the student ID of "ST003" has an "approval" for the assignment and expresses an opinion of "If we all help together, there will be no problems." (step S72 of FIG. 10A). The opinion flag of the student C designated by the teacher 1t is set as "0" (*a: upon designation: step S57 of FIG. 10B).

Further, the student C selects the "completely the same" button 243 in the same opinion communication screen 24 (FIG. 8) displayed in the student terminal 3 of the student C (*b: upon pressing). The opinion flag of the student C is set as "1" by the processing unit for student terminal 70 (step S75 of FIG. 10B). When the opinion list 912 is redisplayed in the shared screen 8 (*c: re-displaying), the opinion flag of the student C indicates the number "1". Upon redisplaying of the shared screen 8 (FIG. 9), the opinion of the student C is masked by the processing unit for teacher terminal 50 (step S60 of FIG. 10B) and exempted from the next candidates for presentation. The number of exempted presentations of the student B is counted up.

The student D having the student ID of "ST004" has an "approval" for the assignment and expresses an opinion of "It may be used for burial." (step S72 of FIG. 10A). Due to this opinion, the student D is determined as having the same opinion as that of the student C by the processing unit for teacher terminal 50 and thus, the opinion flag of the student D is set as "0" (*a: upon designation: step S55 of FIG. 10A).

Further, the student D did not select any one of the buttons 243, 244, 245 during displaying of the shared screen 8 in an enlarged scale in the same opinion communication screen 24 (FIG. 6) displayed due to the determination that the student D has the same opinion as that of the student A (*b: upon pressing). The opinion flag of the student D is erased and changed to the symbol "-" (null), which indicates non-setting, by the processing unit for student terminal 70 (step S75 of FIG. 10B).

The opinion flag of the student D is not "1" and thus, a determination process for the student D is not performed by the processing unit for student terminal 70. Thereafter, when the opinion list 912 is redisplayed in the shared screen 8 ("*c: upon re-displaying"), the opinion flag of the student D indicates the symbol "-" (null) which indicates non-setting. The opinion flag of the student D is not masked (step S60 of FIG. 10B) upon re-displaying of the shared screen 8 (FIG. 8). The student D becomes the next candidate for presentation.

The student E having the student ID of "ST005" has an "approval" for the assignment and expresses the opinion of "There is no difference between us. A disaster due to earthquake may occur anywhere." (step S72 of FIG. 10A). Due to this opinion, the student E is determined as having the same opinion as that of the student A by the processing unit for teacher terminal 50 and thus, the opinion flag of the student E is set as "0" (*a: upon designation: step S57 of FIG. 10B).

Further, the student E selects the "want to supplement" button 244 in the same opinion communication screen 24 (FIG. 8) displayed due to the determination that the student E has the same opinion as that of the student C (*b: upon pressing). The opinion flag of the student E is set as "2" by the processing unit for student terminal 70 (step S75 of FIG. 10B).

Since the opinion flag of the student E does not indicate "1", that is, the student E did not press the "completely the same" button 243, counting up of the number of exempted presentations (step S77 of FIG. 10B) are suppressed and are not performed.

Thereafter, when the opinion list 912 is redisplayed in the shared screen 8, the opinion flag of the student E indicates "2". Upon redisplaying (*c: re-displaying) of the shared screen 8, the opinion of the student E is not masked (step S60 of FIG. 10B). The student E becomes the next candidate for presentation.

The student F having the student ID of "ST006" has a "disapproval" for the assignment and expresses an opinion of "There is a problem for the place. There will not be any remaining places" (step S72 of FIG. 10A). Due to this opinion, the student F is determined as having an opinion different from that of the student A and thus, no value is set in the opinion flag, that is, the opinion flag of the student F maintains an unset state (*a: upon designation: step S55 of FIG. 10A).

Further, the events of the "*b: upon pressing" does not exist in a processing for the student C due to the determination that the opinion of the student F is different from that of the student C. Accordingly, the opinion flag of the student F is not changed. Accordingly, the opinion flag of the student F maintains the unset state at "*c: upon redisplaying". That is, the opinion of the student F is not masked (step S60 of FIG. 10B) upon redisplaying of the shared screen 8 ("*c: upon re-displaying").

The processing for the student G and the student H are the same as that of the student F and thus, description thereof will be omitted. The opinions of the student G and student H are not masked (step S60 of FIG. 10B) upon redisplaying of the shared screen 8 ("*c: upon re-displaying").

As a result, the students D and E are displayed to be easily discerned as the next candidates for presentation upon redisplaying of the shared screen 8 (FIG. 9) except for the student A who is the representative presenter and the students B and C among the student C and a group of students A, B, D and E who have the same opinion as that of the student C.

In a case where the student E is designated as a representative presenter after the student A and then, supplements the opinion of the student A, who is the ex-representative presenter, upon redisplaying of the shared screen 8 (FIG. 9), the number of exempted presentations may be changed to a value according to a predetermined percentage. In this case, when the predetermined percentage is "50%", the number of exempted presentations of the student E is changed from the number "2" to the number "1". Further, when the student E has presented an opinion different from that of the ex-representative presenter, the predetermined percentage may be set as "90%". That is, the number of exempted presentations may be reduced according to the percentage of a kind of opinion such as a supplemental opinion or different opinion.

Specifically, it may be desirable to adopt a reduction percentage weighted configuration in which a reduction percentage is designated in such a manner that about the opinion of the representative presenter, when the "completely the same" button 243 is pressed in the same opinion communication screen 24 (FIG. 8), the number of exempted presentations is reduced by "20%", when the "want to supplement" button 244 is pressed, the number of exempted presentations is reduced by "50%", and when the "differ in opinion" button 245 is pressed and any of the buttons 243, 244 and 245 is not pressed, the number of exempted presentations is reduced by "90%", in the process of step S56 of FIG. 10A.

In a case where the student E, who has the opinion of supplementing the opinion of the student A who is the ex-representative presenter, is designated by the teacher 1*t* (step S53 of FIG. 10A), when referring to the opinion DB 33 illustrated in FIG. 12, a student who belongs to a group to which opinions regarded as the same opinion of the student E belongs and has the "opinion flag" other than "9", "1" and "2" is the student D (step S54 of FIG. 10A), and the students who have the "opinion flag" other than "9", "1" and "2" in the same group are only the student E and the student D.

When referring to the student DB 31 (FIG. 11), the number of exempted presentations of the student D is "0" and the number of exempted presentations of the student E is "2" and thus, the student E who has the largest number of exempted presentations is specified as the representative presenter (step S55 of FIG. 10A). The current opinion flag "2" of the student E of the opinion DB 33 is temporarily stored in a work area of the storage unit 130 and then, set the opinion flag as "9". In this case, the same opinion communication screen 24 (FIG. 8) is displayed only in the student terminal 3 of the student D.

When the reduction percentage weighted configuration described above is adopted, instead of resetting the number of exempted presentations of the student E of the student DB 31, the number of exempted presentations of the student E of the student DB 31 is reduced from "2" to "1" (step S56 of FIG. 10A) based on the reduction percentage of "50%" which corresponds to the opinion flag "2" (that is, "want to supplement") temporarily stored in the work area.

In this example, the opinion flag and the reduction percentage of the number of exempted presentations are made to correspond with each other as follows: • The reduction percentage of "20%" corresponds with the opinion flag of "1" (that is, "completely the same"). • The reduction percentage of "50%" corresponds with the opinion flag of "2" (that is, "want to supplement"). • The reduction percentage of "90%" corresponds with the opinion flag "-" (that is, "differ in opinion" or none of button pressed).

Further, the number of exempted presentations is not limited to the reduction percentage of the number of exempted presentations, but may be appropriately set by the teacher 1*t* depending on a class subject and or contents of a class.

In a case where a presenter selection support process according to the embodiment as described above is not performed, when the number of enrolled students of a class is multiple (e.g., forty (40) students), the teacher 1*t* is not easily able to group the students 3*c* having the same opinion. Accordingly, the teacher 1*t* either causes each student 3*s* of forty (40) students 3*s* divided from the opinion list 812 of the shared screen 8 to arbitrarily present his opinion one by one or reads the opinion of each student 3*s*. Since time is wasted by merely grasping the contents of the opinions of each student 3*s*, it may be difficult to efficiently collect opinions of all the students within a class hour.

Further, in a case where the teacher 1*t* actually designates and causes a student 3*s* to present his opinion, the student 3*s* may easily express as "I have the same opinion as that of Mr. XX" and thus, time may be wasted when an attempt to cover various opinions is made. Further, there is a student who expresses his opinion easily as "I have the same opinion as that of Mr. XX" to avoid presenting his opinion though the student 3*s* has a different viewpoint, among the students 3*s* who speak such a statement.

However, in a case where the presenter selection support process according to the embodiment is applied, a student 3*s*, who has the largest number of times that he has selected an item indicating that the opinion of the student is the same as a presented opinion from choices regarding the presented opinion, is specified as the representative presenter. Therefore, it is possible to suppress the student 3*c* from trying to avoid his presentation by easily expressing that he has the same opinion as that of the representative presenter.

The opinion of the student 3*s* having the "same opinion" as that of a representative presenter is displayed, for example, in masking and thus, the teacher 1*t* may exclude the student 3*s* who has the "same opinion" from the next presenter candidates. Further, a supplemental display is made on the opinion of the student 3*s* who wants to supplement the opinion of the representative presenter and thus, the teacher 1*t* may easily grasp a student 3*s* who is going to present his opinion next. Accordingly, the teacher 1*t* may efficiently designate a plurality of students 3*s* who have various opinions within a class hour.

In the present embodiment, one opinion is selected so as to determine a representative presenter based on the number of times that the student has exempted from presentations in the past among the same opinions as the designated opinion in the plurality of displayed opinions and thus, it is possible to suppress the student from being continuously exempted from opinion presentation.

From the matters described above, the embodiment may be summarized as follows.

(1) There is a type of class in which opinions inputted in the student terminal 3 are collected and displayed in a screen (shared screen 8) by the server 100 (or the teacher terminal 1) and a student 3*s* is caused to present his opinion regarding an opinion designated by manipulation of the teacher 1*t*.

(2) In the type of class as described in paragraph (1), when the student 3*s* is caused to present his opinion against each of the displayed opinions, it is inefficient in use of time.

(3) In paragraph (2), in a case where several students 3*s* who have similar opinions exist, an efficient method of conducting the class is that one student 3*s* representative of several students 3*s* is caused to present the opinion and the other students 3*s* are caused to present supplementary matters.

(4) In the case of paragraph (3), the student 3*s* other than the representative presenter may present that "I have the same opinion" as that of the presenter to try to avoid presenting his opinion though the student 3*s* although actually having some difference.

(5) In the embodiment, in consideration of paragraph (4), when the method as described in paragraph (3) is performed, it is possible to suppress the student 3*s* from avoiding his opinion presentation by expressing "I have the same opinion" as that of the representative presenter.

The present disclosure is not limited to the specific embodiments described above but various changes and modification may be made thereto without departing from the scope of claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
a teacher terminal coupled to a presenter selection support device;
a plurality of student terminals, each comprising a user interface and coupled to the presenter selection support device;
a central display coupled to the presenter selection support device;
the presenter selection support device comprising:
a memory; and
a processor coupled to the memory and configured to:
receive a plurality of opinions from the plurality of student terminals,
display on the central display the plurality of opinions,
receive a selection of a first opinion from the teacher terminal, the first opinion having been selected from among the plurality of opinions,
identify on the central display a subgroup of opinions in a manner that visually distinguishes the subgroup of opinions from other opinions in the plurality of opinions, the subgroup comprising the first opinion and one or more other related opinions which relate to the first opinion,
identify, from among the subgroup of opinions, a second opinion for a first presentation by a user at a corresponding student terminal, based on a history of presentations of the user, the history of presentations being a number of times the user has chosen not to make a presentation,
identify the second opinion on the central display in a manner that visually distinguishes the second opinion from the other opinions in the subgroup of opinions,
generate a display window in the user interface at each of the student terminals associated with users that input the opinions in the subgroup of opinions other than the second opinion, the display window in the user interface presenting at least a first user-selectable item for allowing the users to request a supplemental presentation after the first presentation,
when the supplemental presentation is requested, identify on the central display a third opinion corresponding to another user requesting the supplemental presentation, by displaying an auxiliary display window displaying an indication of the request of the supplemental presentation, and
when the supplemental presentation is not requested, update the history of presentations associated with each user declining the supplemental presentation.

2. A presenter selection support method executed by a processor, the presenter selection support method comprising:
receiving a plurality of opinions from a plurality of student terminals;
displaying on a central display the plurality of opinions;
receiving a selection of a first opinion from a teacher terminal, the first opinion having been selected from among the plurality of opinions;
identifying on the central display a subgroup of opinions in a manner that visually distinguishes the subgroup of opinions from other opinions in the plurality of opinions, the subgroup comprising the first opinion and one or more other related opinions which relate to the first opinion;

identifying, from among the subgroup of opinions, a second opinion for a first presentation by a user at a corresponding student terminal, based on a history of presentations of the user, the history of presentations being a number of times the user has chosen not to make a presentation;
identifying the second opinion on the central display in a manner that visually distinguishes the second opinion from the other opinions in the subgroup of opinions;
generating a display window in a user interface at each of the student terminals associated with users that input the opinions in the subgroup of opinions other than the second opinion, the display window in the user interface presenting at least a first user-selectable item for allowing the users to request a supplemental presentation after the first presentation;
when the supplemental presentation is requested, identifying on the central display a third opinion corresponding to another user requesting the supplemental presentation, by displaying an auxiliary display window displaying an indication of the request of the supplemental presentation; and
when the supplemental presentation is not requested, updating the history of presentations associated with each user declining the supplemental presentation.

3. The system according to claim 1, wherein in identifying the second opinion on the central display, the processor is configured to display the second opinion in an enlarged scale relative to the display of the other opinions in the plurality of opinions.

4. The system according to claim 1, wherein the processor is configured to display the auxiliary display window in an obstructed portion of an area of the central display displaying the third opinion.

5. The system according to claim 1, wherein in identifying the second opinion for the first presentation, the processor is configured to identify from among the subgroup of opinions an opinion corresponding to the user who has chosen not to make a presentation the highest number of times.

6. The system according to claim 1, wherein when the supplemental presentation is not requested, the processor is configured to update the history of presentations associated with each user declining the supplemental presentation by increasing the number of times each user has chosen not to make a presentation.

7. A system comprising:
a teacher terminal coupled to a presenter selection support device;
a plurality of student terminals each comprising a user interface and coupled to the presenter selection support device;
a central display coupled to the presenter selection support device;
the presenter selection support device comprising:
a memory; and
a processor coupled to the memory and configured to:
receive a plurality of opinions from a plurality of student terminals;
display on the central display the plurality of opinions;
receive a selection of a first opinion from the teacher terminal, the first opinion having been selected from among the plurality of opinions;
identify on the central display a subgroup of opinions in a manner that visually distinguishes the subgroup of opinions from other opinions in the plurality of opinions, the subgroup comprising the first opinion and one or more other related opinions which relate to the first opinion;

identify, from among the subgroup of opinions, a second opinion for a first presentation by a user at a corresponding student terminal, based on a history of presentations of the user, the history of presentations being a number of times the user has chosen not to make a presentation;

identify the second opinion on the central display in a manner that visually distinguishes the second opinion from the other opinions in the subgroup of opinions;

generate a display window in a user interface at each of the student terminals associated with users that input the opinions in the subgroup of opinions other than the second opinion, the display window in the user interface presenting at least a first user-selectable item for allowing the users to request a supplemental presentation after the first presentation;

when the supplemental presentation is requested, identify on the central display a third opinion in a manner that visually distinguishes the third opinion from other opinions of other users declining the supplemental presentation, the third opinion corresponding to another user requesting the supplemental presentation; and when the supplemental presentation is not requested, update the history of presentations associated with each user declining the supplemental presentation.

* * * * *